June 29, 1943.  H. M. JOHNSTON ET AL  2,323,091
CHUCK
Filed March 24, 1942  2 Sheets-Sheet 1

INVENTOR
HARRY M. JOHNSTON and
GEORGE SNEDDON, JR.
by
John C. Jackson
Their Attorney June 29, 1943.  H. M. JOHNSTON ET AL  2,323,091
CHUCK
Filed March 24, 1942  2 Sheets-Sheet 2
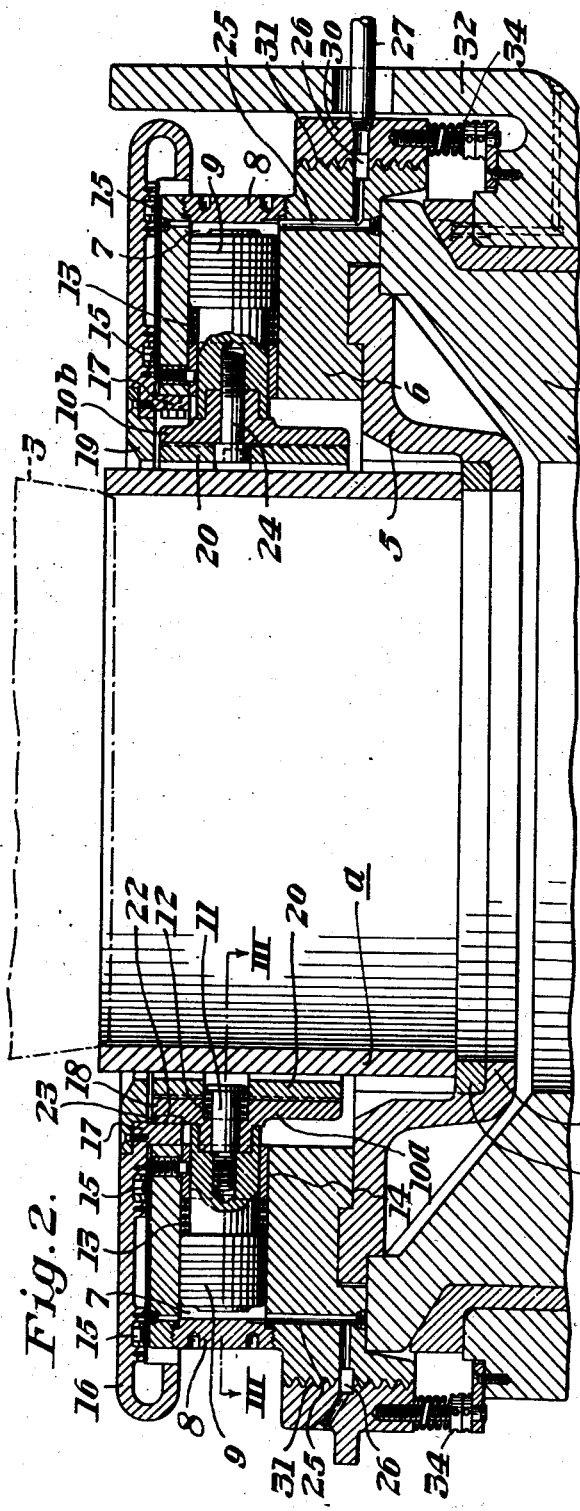
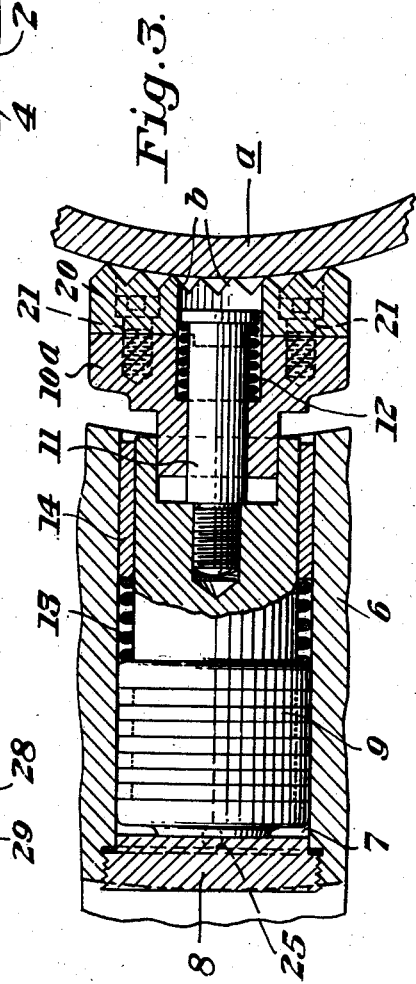
INVENTOR
HARRY M. JOHNSTON and
GEORGE SNEDDON, JR.
by John C. Jackson
Their Attorney Patented June 29, 1943

2,323,091

UNITED STATES PATENT OFFICE 2,323,091

CHUCK

Harry M. Johnston and George Sneddon, Jr., McKeesport, Pa., assignors to National Tube Company, a corporation of New Jersey Application March 24, 1942, Serial No. 436,038

9 Claims. (Cl. 279—4)

This invention relates to improvements in chucks and the like of the character particularly adapted for centering and securing cylindrical pipe couplings and similar articles for boring, reaming and tapping operations.

In the machining of pipe couplings, it is necessary to grip and hold the same with sufficient pressure to resist the action of the tool while at the same time it is desired to prevent distortion of the coupling, which latter action causes uneven boring, reaming or tapping and results in bad threads and inefficient joints with other threaded articles.

It is an object of our invention to provide a chuck of the character stated wherein the coupling or the like may be initially centered and then firmly secured in centered location with minimum distortion.

We contemplate in such a chuck, the employment of manually operable means for centering the coupling or work, combined with fluid actuated means for uniformly gripping the same during boring, reaming or tapping operations, and also provide for a quick and effective release of the work from the chuck.

Further objects are to provide a simple and efficient chuck, capable of speedy positive gripping action, and one which is durable in use.

Additional objects and advantages will become apparent from the following description taken in connection with the accompanying drawings, wherein:

Fig. 2 is a cross sectional view thereof taken on the line II—II of Fig. 1;

Fig. 3 is an enlarged sectional view taken on line III—III of Fig. 2, showing one of the manually actuated jaws in centering position;

Fig. 4 is a fragmentary view of a portion of Fig. 1, showing the means for accommodating different sized couplings or the like.

Figure 1:
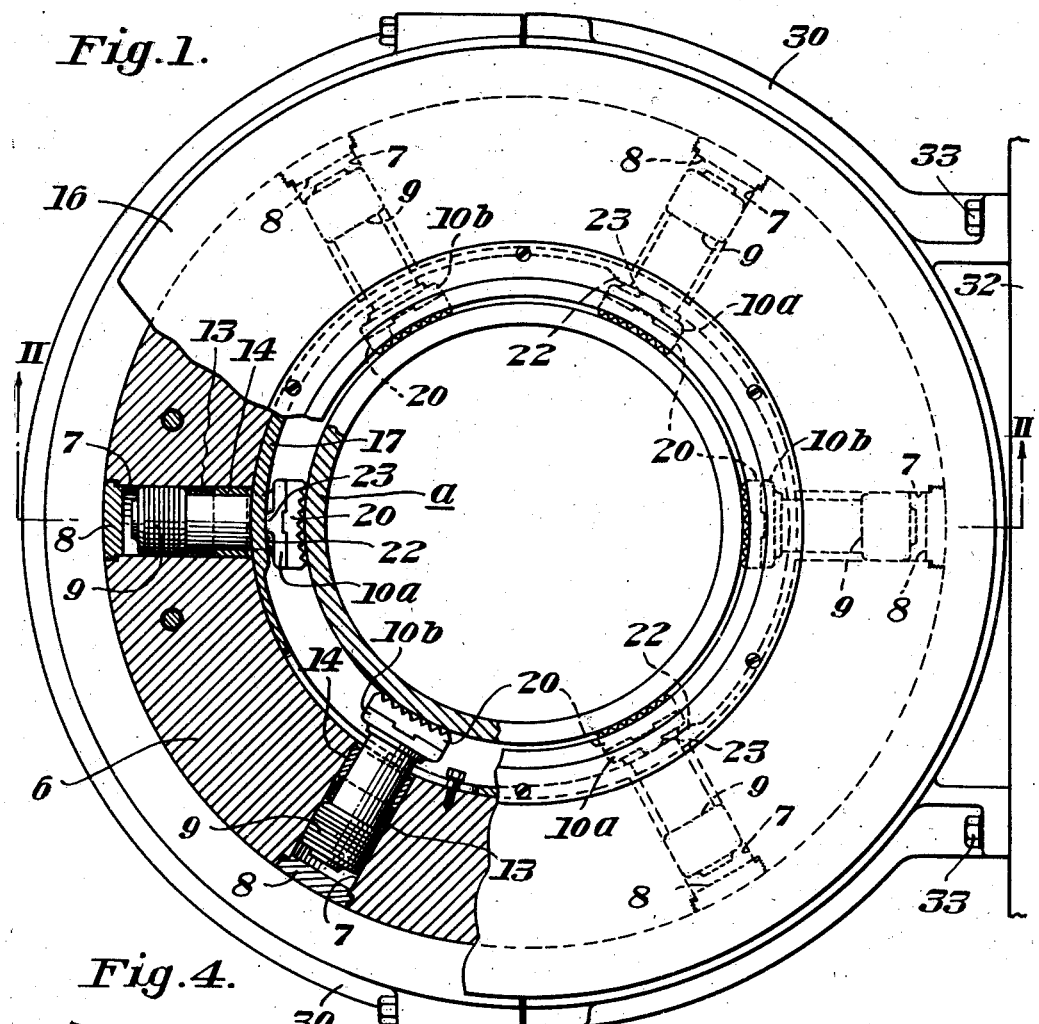
Fig. 1 is a top plan view of a chuck embodying our invention in gripping position, partially broken away to show the gripping means.

Referring to the drawings, our invention is illustrated as adapted to the rotating chuck 2 of a vertical tapping or boring machine employed for machining couplings and the like, wherein the tap or boring tool 3 does not rotate and is raised and lowered in relation to the chuck and the work positioned in the latter, such illustration being by way of example only, since the features of our invention may be incorporated in other chucks to attain similar advantages and results.

The chuck 2 is rotatably driven in any suitable manner and includes a rotatable support 4 mounting a carrier ring 5 in turn supporting the chuck body 6. Said body is in the form of a ring and is radially bored to form a plurality of equally spaced fluid cylinders 7, each cylinder being closed at its outer end by a head 8. Pistons 9 are reciprocably mounted in said cylinders and extend inwardly of the latter to mount chuck jaws or grippers as follows.

Three equally spaced pistons 9 carry jaw supporting heads 10a slidably supported on headed studs 11 centrally secured to the inner ends of the pistons, the heads being recessed to receive the headed ends of the studs. Springs 12 are disposed on the studs normally retracting the heads 10a against their pistons 9. All of said cylinders and pistons are provided with springs 13, of greater strength than springs 12, disposed between an enlargement on the pistons and sleeves 14 secured in the cylinders normally urging the pistons in outward retracted position with respect to the chuck body.

Rotatably supported on the upper face of the chuck body 6 as by roller bearings 15, we provide a handwheel 16 having an inner annular rim or flange 17 depending outwardly behind the upper projecting ends 18 of the jaw supporting heads 10a. A retainer ring 19 is removably secured to the handwheel and extends inwardly above the said ends 18 of the jaw supporting heads, the upper faces of said ends coacting with the ring 19 to guide the heads 10a during radial motion thereof in the chuck body without rotation about their piston axes. Serrated jaws or grippers 20 are secured to the inner vertical faces of the supporting heads 10a by screws 21, as shown in Fig. 3.

Adjacent each of said jaw supporting heads 10a, the rim 17 of handwheel 16 is provided with similar cam portions 22 coacting with cam follower lugs or projections 23 on the portions 18 of said jaw supporting heads to displace the heads 10a inwardly of the chuck body relative to their pistons 9 by a right-hand rotation of the handwheel, whereby the heads 10a and their jaws 20 are moved toward a coupling $a$ inserted therebetween to initially grip and accurately center said coupling in the chuck. The initial centering motion of one of said jaws is illustrated by the pisition of Fig. 3.

The remaining pistons 9 have similar jaw supporting heads 10b fixedly secured thereto, as by screws 24, similarly carrying serrated jaws or grippers 20, said pistons and jaws being normally retracted outwardly as by the springs 13. The pistons having heads 10ᵇ are not actuated by the cams 22 and hence remain in retracted position during the said initial manual centering operation by the other jaws and pistons.

The outer end of each cylinder 7 is provided with a fluid passage 25 connected by suitable passages in the chuck body 6 with a common supply manifold 26, the latter being connected with a suitable supply as by a conduit 27 whereby fluid under pressure may be supplied to and exhausted from the cylinders by the use of a three-way valve or the like in said conduit.

Upon admitting such fluid under pressure to all of the cylinders, all of the pistons 9 are moved to engage their jaws 20 with the previously centered coupling a to secure the same for machining by the tool 3. Since the coupling is centered, the fluid pressure is transmitted equally to all the jaws, and by restricting said pressure to a proper amount, the coupling will be securely held without distortion and with proper rigidity to oppose the rotary forces of the machining operations.

When the fluid pressure is exhausted from the cylinders 7, the springs 13 retract the pistons and jaws out of engagement with the coupling a, and upon a reverse rotation of the handwheel 16, the centering jaws actuated thereby will be retracted against their pistons by the springs 12, whereupon the coupling may be removed and another inserted to be centered and gripped as before.

The carrier ring 5 is inwardly flanged at 28, supporting a removable bearing or seating ring 29 upon which the coupling or work a rests while supported in the chuck. The bearing ring 29 is apertured to permit the tool 3 to pass therethrough, and the said rings are changed when utilizing the chuck for different sizes of couplings. Different sized retainer rings 19 are likewise employed when the chuck is used for couplings of different sizes.

Figure 4:
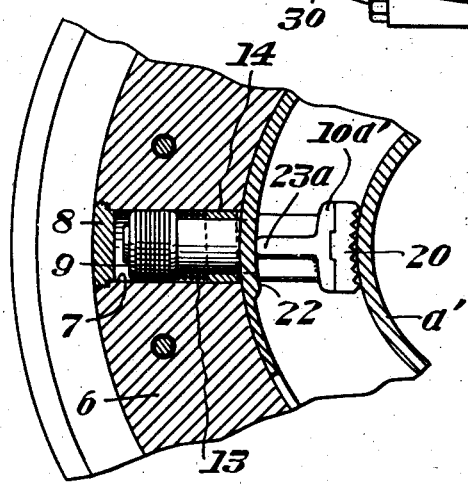

Also, in order to accommodate the chuck to different sized couplings, the jaw supporting heats 10ᵃ and 10ᵇ are changed, several sets of heads being employed for the range of diameters of couplings to be machined. In such case, the jaws proper 20 are secured to the heads as before, the radial dimension of the heads being altered to position the jaws in operative gripping relation to the coupling by the manual and fluid action as described. One of the heads 10ᵃ' of different size is shown in Fig. 4, having a follower lug 23ᵃ for cam actuation thereof by cam 22 of handwheel 16 to center a coupling a' of small diameter.

In order to introduce the fluid to cylinders 7 of rotating body 6, the manifold 26 is formed partly in the exterior of the body and partly in a stationary split sealing ring 30 surrounding said body, the surface engagement of said body and ring being in the form of annular concentric interlocking grooves and ribs as shown at 31 in Fig. 2. Ring 30 is secured to the frame 32 of the machine as at 33, and is resiliently supported on spring jacks 34 to maintain a suitable sealing pressure at the said interlocking surface 31 with the chuck body, thus preventing fluid leakage at the manifold 26.

Figure 5:
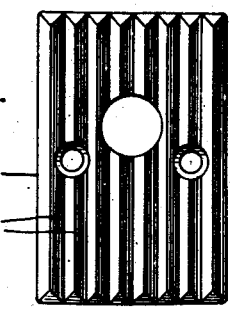
Fig. 5 is a face view of one of the gripping jaws.

A further feature of our invention resides in the provision of multiple line grips for the jaws 20. The gripping face thereof is concave with a radius corresponding to that of the exterior of the coupling a and of appreciable lateral width, being provided with a plurality of spaced vertical serrations b as shown in Fig. 5, thus distributing the gripping pressure over the coupling, minimizing the marking or scoring of the coupling. By means of such jaws and of a plurality thereof actuated in the manner described, we have substantially eliminated pressure concentrations which have heretofore caused deformation of the work.

It will therefore be seen that we have provided a chuck capable of centering, gripping and holding couplings and the like for machining operations, in which the gripping pressure is adequately and uniformly distributed so as to minimize distortion and injury to the work. Our chuck is simple and easily operated, and will enable increased production upon boring and tapping machines, both from the standpoint of speed of operation and by reducing the number of defective work pieces.

Various changes and modifications are contemplated within the scope of the following claims.

We claim:

1. In a chuck of the character described, the combination with a plurality of jaws, of means for initially simultaneously actuating some of said jaws to engage and center the work, and separate means for simultaneously actuating all of said jaws to grip the work.

2. In a chuck of the character described, the combination with a plurality of jaws, of cam means for actuating some of said jaws to engage and center the work, and fluid actuated means for simultaneously actuating all of said jaws to grip the work.

3. In a chuck of the character described, the combination with a chuck body having a plurality of cylinders therein, pistons reciprocable in the cylinders, gripping means mounted on the pistons, cam means engageable with some of said gripping means for simultaneous movement thereof into contact with the work, and means for supplying fluid under pressure to all of said cylinders and pistons for gripping the work by all of said gripping means.

4. In a chuck of the character described, the combination with a chuck body having a plurality of radial cylinders therein, pistons reciprocable in the cylinders, jaw supporting heads on the pistons, a handwheel disposed about said heads and having spaced cams thereon for radially displacing the heads of spaced pistons, work-engaging jaws on the heads, and means for supplying fluid under pressure to all of said cylinders and pistons.

5. In a chuck of the character described, the combination with a chuck body, of fluid actuated pistons mounted therein, work-gripping means carried by said pistons, said means including jaw supporting heads carried by some of the pistons and movable relative to said pistons, cam means engageable with said heads to displace the same into work-engaging position, and springs normally retracting all of the pistons.

6. In a chuck of the character described, the combination with a chuck body having a series of radial fluid cylinders therein, of pistons reciprocable in the cylinders, the pistons of three equally spaced cylinders having jaw supporting heads, means supporting the heads on their pistons for movement relative thereto, a handwheel disposed adjacent said heads and having spaced similar cams thereon engageable with the heads for inward displacement of the latter, springs normally urging the heads toward their pistons, springs in all of the cylinders normally retracting the pistons therein, jaw supporting heads on the other pistons, gripping jaws carried by all the heads, and means for supplying fluid to all of the pistons and cylinders for simultaneously urging the jaws into engagement with the work.

7. In a chuck of the character described, the combination with a chuck body having a series of radial fluid cylinders therein, of pistons reciprocable in the cylinders, the pistons of three equally spaced cylinders having jaw supporting heads, means supporting the heads on their pistons for movement relative thereto, a handwheel disposed adjacent said heads and having spaced similar cams thereon engageable with the heads for inward displacement of the latter, springs normally urging the heads toward their pistons, springs in all of the cylinders normally retracting the pistons therein, jaw supporting heads on the other pistons, gripping jaws carried by all the heads, said jaws having a lateral concavity corresponding to the radius of the work and having a plurality of longitudinal work-engaging serrations, and means for supplying fluid to all of the pistons and cylinders for simultaneously urging the jaws into engagement with the work.

8. In a chuck of the character described, the combination with a rotatable chuck body having a plurality of radial equally spaced fluid cylinders formed therein, of pistons reciprocable in said cylinders, jaw supporting heads carried by the pistons, means mounting the heads of the pistons of three equally spaced cylinders for movement relative to said pistons, springs normally resisting said movement, the three heads having cam follower lugs thereon, a handwheel rotatably mounted on the body about the piston heads and having spaced similar cams thereon engageable with the follower lugs for displacing the said three heads radially inward by rotation of the handwheel, springs normally retracting all of the pistons, gripping jaws on all of said piston heads, and means for supplying fluid to all of said pistons and cylinders for simultaneously urging the jaws into engagement with the work.

9. In a chuck of the character described, the combination with a rotatable chuck body having a plurality of radial equally spaced fluid cylinders formed therein, of pistons reciprocable in said cylinders, jaw supporting heads carried by the pistons, means mounting the heads of the pistons of three equally spaced cylinders for movement relative to said pistons, springs normally resisting said movement, the three heads having cam follower lugs thereon, a handwheel rotatably mounted on the body about the piston heads and having spaced similar cams thereon engageable with the follower lugs for displacing the said three heads radially inward by rotation of the handwheel, springs normally retracting all of the pistons, gripping jaws on all of said piston heads, a stationary sealing ring engaging an annular surface of the rotatable body, said ring and body having annular communicating fluid passages therein forming a fluid manifold, a fluid supply conduit on the ring communicating with the manifold, and said body having fluid passages connecting each of the cylinders with the manifold.

HARRY M. JOHNSTON.
GEORGE SNEDDON, Jr.